(12) United States Patent
Huras et al.

(10) Patent No.: US 7,080,228 B2
(45) Date of Patent: Jul. 18, 2006

(54) REDUCED SYNCHRONIZATION RESERVATION SYSTEM AND METHOD FOR A SHARED MEMORY BUFFER

(75) Inventors: Matthew Albert Huras, Ajax (CA); David C. Kalmuk, Toronto (CA); John P. Kennedy, Toronto (CA); Herbert W. Pereyra, Toronto (CA); Mark F. Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 10/425,755

(22) Filed: Apr. 29, 2003

(65) Prior Publication Data
US 2004/0181635 A1  Sep. 16, 2004

(30) Foreign Application Priority Data
Mar. 14, 2003  (CA) .................................. 2422252

(51) Int. Cl.
*G06F 12/00* (2006.01)
(52) U.S. Cl. .................... 711/170; 711/147; 709/213
(58) Field of Classification Search ........ 711/129–130, 711/147–148, 170–173, 153; 710/100, 107; 712/220; 709/214–215, 312
See application file for complete search history.

(56) References Cited

U.S. PATENT DOCUMENTS

| | | | | |
|---|---|---|---|---|
| 5,423,008 A * | 6/1995 | Young et al. ............... 710/107 |
| 5,574,922 A * | 11/1996 | James ......................... 712/220 |
| 5,617,537 A * | 4/1997 | Yamada et al. ............. 709/214 |
| 5,689,698 A | 11/1997 | Jones et al. ................. 395/604 |
| 5,815,501 A * | 9/1998 | Gaddis et al. .............. 370/402 |
| 5,895,491 A | 4/1999 | Smolders ..................... 711/147 |
| 5,987,587 A | 11/1999 | Meltzer ....................... 712/23 |
| 6,247,109 B1 * | 6/2001 | Kleinsorge et al. .......... 712/13 |
| 6,266,751 B1 * | 7/2001 | Niescier ...................... 711/173 |
| 6,314,501 B1 * | 11/2001 | Gulick et al. ............... 711/153 |
| 6,341,338 B1 * | 1/2002 | Dennie ........................ 711/147 |
| 6,665,777 B1 * | 12/2003 | West ........................... 711/147 |
| 6,757,759 B1 * | 6/2004 | Jones et al. .................. 710/100 |
| 2002/0144006 A1 * | 10/2002 | Cranston et al. ............ 709/312 |
| 2003/0135579 A1 * | 7/2003 | Han et al. ................... 709/215 |

* cited by examiner

*Primary Examiner*—Nasser Moazzami
(74) *Attorney, Agent, or Firm*—Samuel A. Kassatly

(57) ABSTRACT

A reservation system for making reservations in a shared memory buffer to store information from applications is logically partitioned in a number of fixed size indexed contiguous slots. The reservation system uses an atomic counter that is stored in the shared memory buffer. The value of the atomic counter can be associated with the index of a slot available for reservation. An application making a reservation increases the atomic counter value on a number of reserved slots to provide a value that is associated with the index of the next slot available for reservation. After the reservation is accomplished, the information is written into the reserved slots. The reservation system writes parsing information for further parsing to validate information in the shared memory buffer. The reservation system provides functionality for continuous and instantaneous dumping of the shared memory buffer into a file for cleaning and for wrapping the buffer.

31 Claims, 4 Drawing Sheets

REDUCED SYNCHRONIZATION RESERVATION SYSTEM AND METHOD FOR A SHARED MEMORY BUFFER

PRIORITY CLAIM

The present application claims the priority of Canadian patent application, Serial No. 2,422,252, which is titled "Reduced Synchronization Reservation System and Method for a Shared Memory Buffer," which was filed on Mar. 14, 2003, with the Canadian Patent Office, and which is incorporated herein by reference.

FIELD OF THE INVENTION

The present invention generally relates to the field of memory management, and it more particularly relates to a system and associated method for shared memory reservation.

BACKGROUND OF THE INVENTION

Commonly, software systems require the storage or transmission of discrete units of data in a chronologically ordered fashion. For efficiency purposes, it is preferable to store or transmit data in large blocks. This eliminates the need for many small disk accesses or transmissions of small network packets, which generally have an adverse effect on system performance. It is also common for a software system that chronologically stores units of data in memory to allow direct memory access to collected, discrete units of data.

Software systems having multiple processes and/or multithreaded processes usually use a single shared memory buffer for these discrete units of data. At various times, a process or thread (referred to as a "writer" herein) may reserve a region of memory in the buffer to record its data. From time to time, the data collection operation may be reset and the data currently stored in the buffer should be cleared.

Since the buffer resides in a shared region of memory, the software system should employ a reservation system that ensures concurrent operations do not produce unexpected results. The reservation system should synchronize reservation requests from writers to prevent overlapping. Synchronization is also employed when writing out the data stored using the reservations to a disk or other non-volatile medium or transmitting such data across a network and when clearing the data from reserved memory.

One application of the reservation system for storing data to a shared memory buffer is a diagnostic facility. Mission critical software products employ diagnostic facilities to collect discrete information about the state of the application allowing the application to be serviced from the field. The efficiency of collecting diagnostic information is crucial specifically in a large, complex system having numerous applications, each having one or more writers executing concurrently. The diagnostic facility is usually shared across the entire system so it can provide an overall impression of the system's state. Ideally, the diagnostic facility should have zero impact on the system's performance and functionality. The facility simply needs to quickly record discrete amounts of diagnostic data in the facility's shared memory buffer. Unfortunately, the synchronization of the shared memory introduces performance penalties. In a worst case scenario, the entire system becomes serialized because of lack of performance crucial to the synchronization mechanism. This could lead to a situation where a problem in the system could not be properly diagnosed because of the negative performance impact of the diagnostic facility.

A diagnostic facility reservation system typically comprises collection and parsing stages. The collection stage occurs when writers make reservations of a portion of the shared memory and store data in those reserved portions. In this stage, the data in the shared memory buffer may be written to disk or may be cleared if the buffer is reset. Performance is critical in this stage because the reservation system should attempt to minimize its impact on the application.

The parsing stage involves examining the collected data obtained during the collection stage; the collected data is typically stored in a data file. Performance is relatively unimportant in this stage. Examining the data file is often independent of the application's core function. It may even be performed on a different computer. Reservation systems that simplify the parsing stage typically penalize the performance of the collection stage.

Existing reservation system implementations employ overly complicated synchronization mechanisms, using semaphores, mutexes, etc.

Other software reservation systems usually synchronize for the entire duration of the operation. For example, the reservation logic is usually implemented using the following steps: 1) Wait until the shared memory buffer is unlocked; 2) Lock the shared memory buffer (synchronize); 3) Make the reservation; 4) Return the reservation region to the writer; 5) Wait until writer is finished using the reserved region; and 6) Unlock the shared memory buffer. Clearing or storing the buffer to disk follows a similar logic, comprising steps of: 1) Waiting until the shared memory buffer is unlocked; 2) Locking the shared memory buffer (synchronize); 3) Clearing the shared memory buffer (or writing to disk); and 4) Unlocking the shared memory buffer.

This lengthy lock-out approach causes writers to queue up, waiting for their chance to acquire the shared memory lock. The operations that occur "under the lock" take a relatively long time, especially the file input/output (I/O) involved in storing the buffer on disk. This may cause the reservation system to serialize the entire software system.

Therefore, there is a need for a reservation system to provide efficient memory reservation in a shared memory buffer. Furthermore, the needed reservation system should minimally impact the entire software system while memory reservation is being undertaken. The need for such a system has heretofore remained unsatisfied.

SUMMARY OF THE INVENTION

The present invention satisfies this need, and presents a system, a computer program product, and an associated method (collectively referred to herein as "the system" or "the present system") for providing a data processing system for reserving portions of a shared memory buffer among a plurality of writers sharing the buffer, the data processing system comprising an interface for receiving and responding to individual requests from the plurality of the writers. Each of the requests from an individual writer reserves a contiguous portion of the buffer for writing by the writer. A synchronization mechanism atomically reserves a portion of the shared memory buffer in response to each request.

In accordance with another aspect of the invention, there is provided, for a data processing system, a method for reserving portions of a shared memory buffer among a plurality of writers sharing the buffer, the method comprising steps of receiving a reservation request from an individual writer to reserve a contiguous portion of the buffer and atomically reserving the contiguous portion of the buffer.

In accordance with another aspect of the invention, there is provided a computer program product having a computer readable medium tangibly embodying computer readable data processing for directing a data processing system to reserve portions of a shared memory buffer among a plurality of writers sharing the buffer. The computer program product comprises code for receiving a reservation request from an individual writer to reserve a contiguous portion of the buffer and code for atomically reserving the contiguous portion of the buffer.

In accordance with another aspect of the invention, there is provided a diagnostic facility for a data processing system. The diagnostic facility comprises a reservation mechanism for atomically reserving individual contiguous portions of a shared memory buffer of the data processing system to individual writers of a plurality of writers sharing the memory buffer. Each individual contiguous portion is reserved for writing diagnostic information by an individual writer.

In accordance with another aspect of the invention, there is provided a computer program product having a computer readable medium tangibly embodying computer readable code for directing a data processing system to implement a diagnostic facility. The computer program product comprises code for implementing a reservation mechanism for atomically reserving individual contiguous portions of a shared memory buffer of the data processing system to individual writers of a plurality of writers sharing the memory buffer. Each individual contiguous portion is reserved for writing diagnostic information by an individual writer.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. An embodiment is implemented in the C or C++ computer programming language (or other computer programming languages in conjunction with C/C++). Any limitations presented would be a result of a particular type of operating system or computer programming language and would not be a limitation of the present invention.

Figure 1:
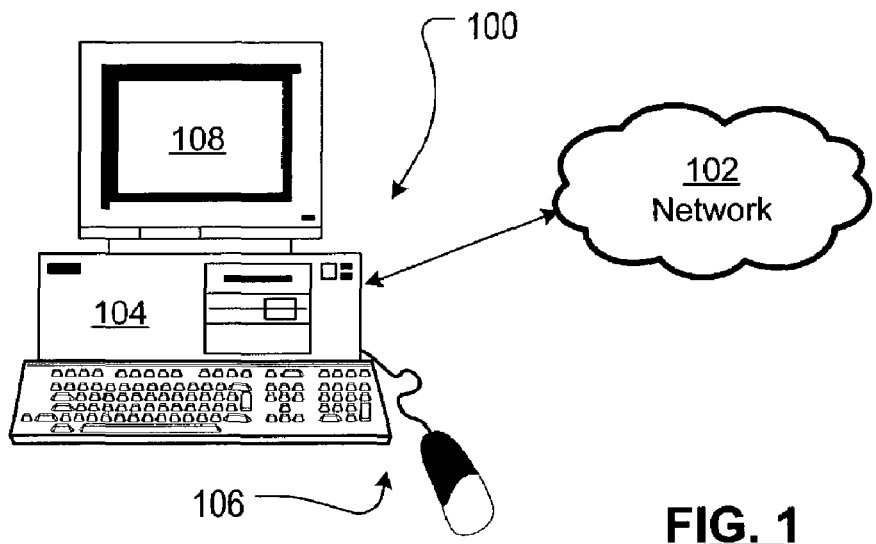
FIG. 1 is a schematic illustration of an exemplary operating environment in which a reduced synchronization reservation system of the present invention can be used.

An embodiment of the invention, computer system 100, is illustrated in FIG. 1. Computer system 100, which is illustrated for exemplary purposes as a computing device, is adapted to communicate with other computing devices (not shown) using network 102. As may be appreciated by those of ordinary skill in the art, network 102 may be embodied using conventional networking technologies and may comprise one or more of the following: local networks, wide area networks, intranets, the Internet, and the like.

Through the description herein, an embodiment of the invention is illustrated with aspects of the invention embodied solely on computer system 100. As may be appreciated by those of ordinary skill in the art, aspects of the invention may be distributed amongst one or more networked computing devices which interact with computer system 100 using one or more networks such as, for example, network 102. However, for ease of understanding, aspects of the invention have been embodied in a single computing device—computer system 100.

Computer system 100 typically comprises a processing system 104 that is enabled to communicate with the network 102, and various input devices 106 and output devices 108. Input devices 106, (a keyboard and a mouse are shown) may also comprise a scanner, an imaging system (e.g., a camera, etc.), or the like. Similarly, output devices 108 (only a display is illustrated) may also comprise printers and the like. Input device 106 and output device 108 may alternately be referenced as I/O devices 106 and 108. Additionally, combination input/output (I/O) devices 106 and 108 may also be in communication with processing system 104. Examples of conventional I/O devices (not shown in FIG. 1) comprise removable recordable media (e.g., floppy disk drives, tape drives, CD-ROM drives, DVD-RW drives, etc.), touch screen displays, and the like.

Figure 2:
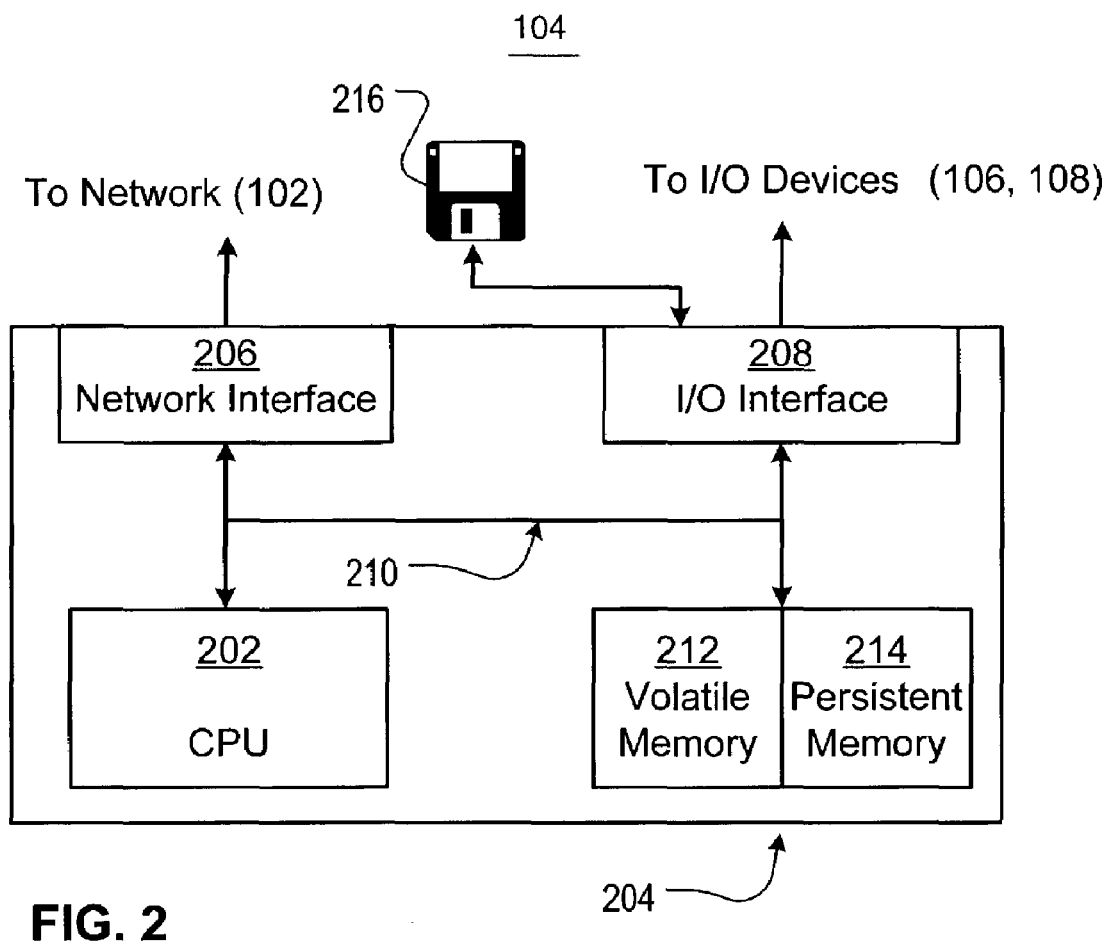
FIG. 2 is a block diagram of the high-level architecture of a portion of the computer system of FIG. 1.

Exemplary processing system 104 is illustrated in greater detail in FIG. 2. As illustrated, processing system 104 comprises a number of components: a central processing unit (CPU) 202, memory 204, network interface (I/F) 206 and input-output interface (I/O I/F) 208. Communication between various components of the processing system 104 may be facilitated via a suitable communications bus 210 as required.

CPU 202 is a processing unit, such as an Intel Pentium™, IBM PowerPC™, Sun Microsystems UltraSparc™ processor, or the like, suitable for the operations described herein. As may be appreciated by those of ordinary skill in the art, other embodiments of processing system 104 could use alternative CPUs 202 and may comprise embodiments in which one or more CPUs 202 are employed (not shown).

CPU 202 may comprise various support circuits to enable communication between itself and the other components of processing system 104.

Memory 204 comprises both volatile memory 212 and persistent memory 214 for the storage of: operational instructions for execution by CPU 202, data registers, application and thread storage, and the like. Memory 204 comprises a combination of random access memory (RAM), read only memory (ROM) and persistent memory such as that provided by a hard disk drive.

Network I/F 206 enables communication between other computing devices (not shown) and other network computing devices via network 102. Network I/F 206 may be embodied in one or more conventional communication devices. Examples of a conventional communication device comprise: an Ethernet card, a token ring card, a modem, or the like. Network I/F 206 may also enable the retrieval or transmission of instructions for execution by CPU 202, from or to a remote storage media or device via network 102.

I/O I/F 208 enables communication between processing system 104 and the various I/O devices 106 and 108. I/O I/F 208 may comprise, for example, a video card for interfacing with an external display such as output device 108. Additionally, I/O I/F 208 may enable communication between processing system 104 and a removable media 216. Removable media 216 may comprise a conventional diskette or other removable memory devices such as Zip™ drives, flash cards, CD-ROMs, static memory devices and, the like. Removable media 216 may be used to provide instructions for execution by CPU 202 or as a removable data storage device.

Figure 3:
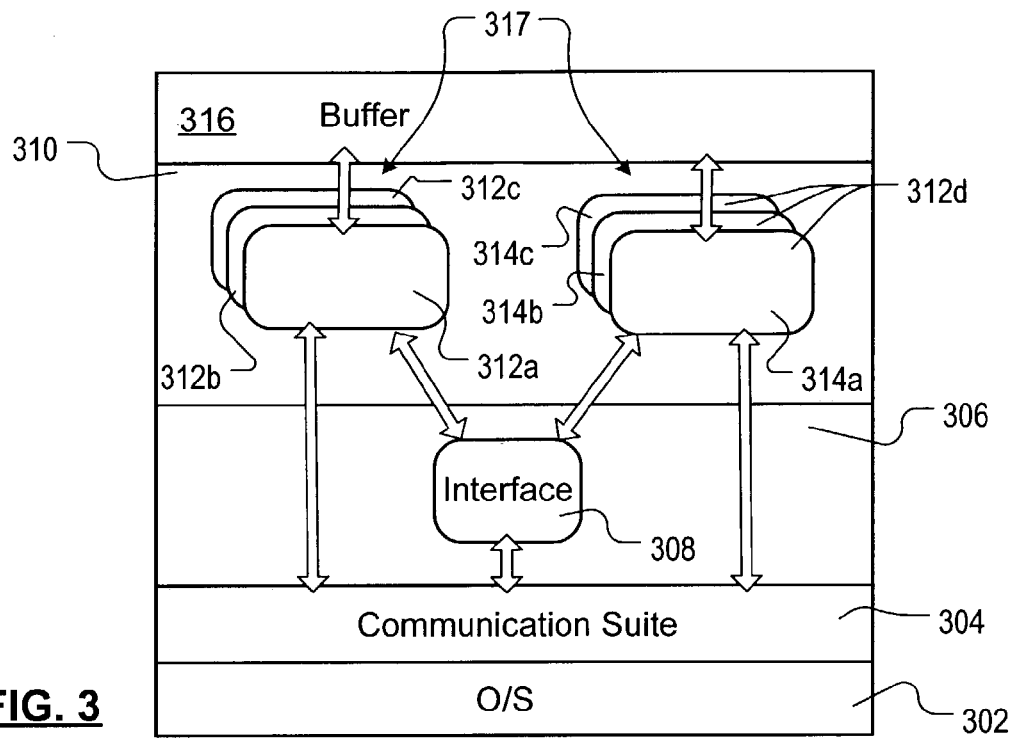
FIG. 3 is a block diagram of the high-level architecture of a portion of the memory of the computer system of FIG. 1, shown in FIG. 2.

The computer instructions/applications stored in memory 204 and executed by CPU 202 (thus adapting the operation of computer system 100 as described herein) are illustrated in functional block form in FIG. 3. As may be appreciated by those of ordinary skill in the art, the discrimination between aspects of the applications illustrated as functional blocks in FIG. 3 is somewhat arbitrary in that the various operations attributed to a particular application as described herein may, in an_alternative embodiment, be subsumed by another application.

As illustrated for exemplary purposes only, memory 204 stores a number of applications and data for enabling the operation of the system for reserving memory 204 that comprise: an operating system (OS) 302, a communication suite 304, and a memory reservation system 306. The memory reservation system 306 (alternately referenced as reservation system 306) comprises a reservation interface 308 (alternately referenced as interface 308) such as an application program interface (API). The system for reserving memory 204 also comprises at least one application 310 comprising multiple processes P1, P2, P3, P4 (312*a*, 312*b*, 312*c*, 312*d*) of which P4 312*d* comprises a multithreaded process having exemplary threads T1, T2 and T3 (314*a*, 314*b*, 314*c*) and a buffer 316. Collectively, said processes 312*a*–312*d* and threads 314*a*–314*c* are referred to as writers 317.

OS 302 is an operating system suitable for operation with a selected CPU 202 and the operations described herein. Multi-tasking, multi-threaded OSs such as, for example, IBM AIX™, Microsoft Windows, Linux or the like, are expected to be preferred in many embodiments. Buffer 316 is specifically reserved as a contiguous region of the memory 204 for storing information. Communication suite 304 provides, through interaction with OS 302 and network I/F 206 (FIG. 2), suitable communication protocols to enable communication with other networked computing devices via network 102 (FIG. 1). Communication suite 304 may comprise one or more of such protocols such as TCP/IP, Ethernet, token ring and the like. Communications suite 304 comprises asynchronous transport communication capabilities for communicating with other computing devices.

The reservation system 306 uses a synchronization mechanism that operates atomically to ensure each reservation request receives a unique reserved portion of the shared memory buffer 316 to improve the performance of the collection stage. An atomic counter in the present embodiment provides a synchronization mechanism that ensures that only one process 312*a*–312*d* or writer 317 can modify the counter's value at a time. The shared memory buffer 316 is divided into numerous fixed size regions called "slots". Reservations are always made in multiples of slots. An atomic sequence counter is used to indicate the next available slot. A writer 317 makes a reservation by incrementing the atomic sequence counter by the number of slots requested. The previous value of the counter is then used to identify the start of the reserved region of memory 204 of the writer 317. It may be understood by persons of ordinary skill in the art that a count down approach may be used with the previous counter value indicating the end of the reserved region of the writer 317.

The reservation system 306 is implemented through an interface 308 that provides functionality to: calculate the memory requirements for a buffer 316; initialize a buffer 316; reserve a region of memory 204 within a buffer 316; synchronize changes to the reserved region of memory 204; invalidate all the current contents of the buffer 316; dump the contents of the entire buffer 316; and parse a buffer dump file.

The reservation system 306, incorporating aspects of the present invention in the exemplary embodiment using the reservation interface 308, provides a memory reservation system 306 for writing information from at least one of the writers 317 into the buffer 316. In the illustrated example, each writer 317 is stored in the memory 204, but it is to be understood that a writer 317 may be executed on another remotely located computing device (not shown) that is enabled to communicate with the interface 308 via communication suite 304. Such an approach is not preferred for many applications as the transmission delays may likely impact the performance of the remotely located computing device. It may be understood by persons of ordinary skill in the art that each writer 317 is adapted to support communication with the reservation interface 308, for example, using an API (not shown).

Figure 4:
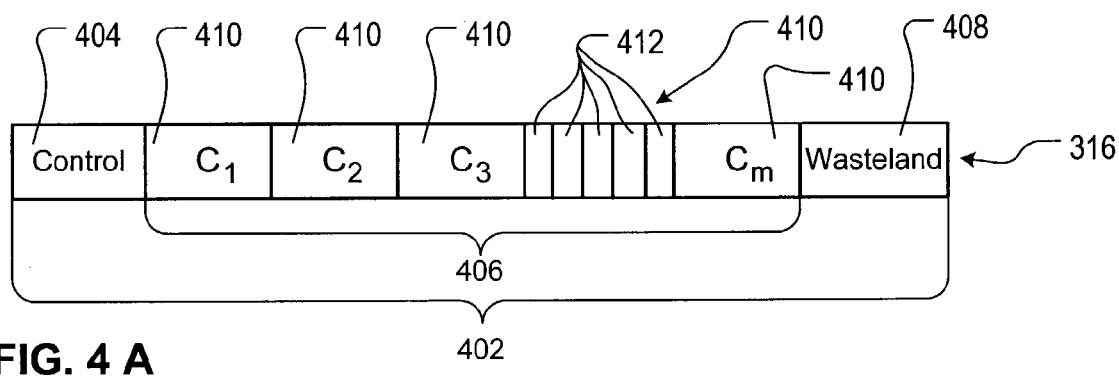
FIG. 4A is a schematic block diagram illustrating a structure of a buffer illustrated in FIG. 3.
FIG. 4B is a schematic block diagram illustrating, in greater detail, a structure of a buffer illustrated in FIG. 4A.
Figure 4B:
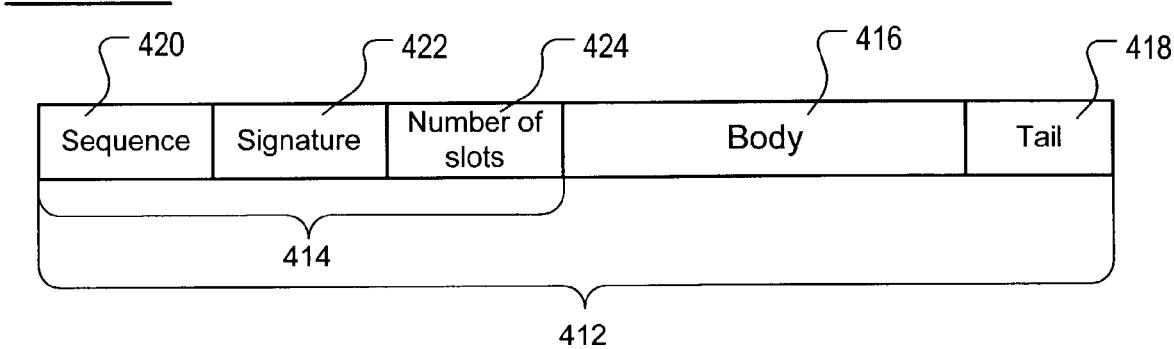

FIG. 4A is a schematic block diagram illustrating a structure of a region 402 of volatile memory 212 reserved for buffer 316. The region 402 of the volatile memory 212 is reserved for a shared memory buffer 316 to provide storage facilities for information from the writers 317. The region 402 comprises a control region 404, a data storing region 406 and a wasteland region 408. The data storing region 406 comprises a number of equal fixed-size portions or chunks 410. Each chunk 410 comprises a plurality of smaller fixed-size portions or slots 412. In the buffer 316 illustrated in FIG. 4B, each slot 412 comprises a header region 414, a body region (body) 416 and a tail region 418. The header region 414 comprises a sequence region 420, a signature region 422 and a number of slots 424.

The reservation system 306 operates using a staged approach. During the collection stage, writers 317 make respective requests to reserve parts of buffer 316 and write respective data in these reserved portions. During the collection stage, one or more data files are created from data stored to buffer 316. During the parsing stage, these one or more data files are examined. In order to perform the reservation, the reservation system 306 uses a number of variables. One of these is an atomic counter variable for indicating the next available slot 412 for reservation among other things as described further below. Employing an atomic counter variable improves performance of the collection stage providing an efficient synchronization mechanism to ensure that only one writer 317 can make a reservation at any one time without any interference from other writers 317. The atomic counter variable is stored in the control region 404 FIG. 4A.

An individual writer 317 requests a reservation through interface 308 to invoke the synchronization mechanism. The synchronization mechanism increments the atomic counter value by the number of slots 424 requested by the writer 317. The previous value of the atomic counter variable, named a sequence variable, is stored in the sequence region 420 and is used to identify the index of the first slot 412 of the reservation. The interface 308 provides the writer 317 with the reservation (i.e. slot number). Once the reservation is obtained, writer 317 is free to modify the reserved memory region and write the information to be stored in the body 416 of the slot 412 as and when desired.

On completion of the modification, writer 317 notifies the reservation system 306 through interface 308. The reservation system 306 then modifies the reserved memory region with a finalization function to indicate that the reserved memory region is complete. In the present embodiment, the reservation system 306 records the sequence number of the reservation into the sequence region 420 of the reserved slot 412. A synchronization value is then written in the tail region 418. This synchronization value is based on the reservation sequence number and is used to indicate that the modifications of the writer 317 are complete. The synchronization value reduces the possibility of incorrectly identifying some regions of the memory 204 as valid reservations. The reservation system 306 also records a special well-known identification value in the signature region 422.

Information in the signature region 422 and tail region 418 is used during the parsing stage to identify valid reservations as discussed further herein below. In the reservation system 306, synchronization for assigning a portion of shared memory buffer 316 only occurs when the atomic counter is modified and no additional synchronization is required. The reservation system 306 does not lock the buffer 316 to prevent future reservations while a writer 317 completes its modifications. This approach reduces the overall synchronization duration and allows writers 317 to concurrently modify their reserved regions. The reservation system 306 can dump (i.e. write out) contents of the buffer 316 into the persistent memory 214 such as a hard disk, as a file. Since the reservation system 306 cannot "lock out" reservations, writers 317 may be making reservations and modifying their reservations while the buffer 316 is written to the data file. This may cause the presence of incomplete data in the dump file. Once the buffer 316 has been written, the reservation system 306 records the current value of the atomic counter variable in the sequence region 420 of the reserved slot 412. A sequence value in the sequence region 420 indicates a sequence number that may be assigned for the next reservation. The sequence value is also used to determine the location of the oldest potentially valid reservation in the dump file for validation purposes during the parsing stage. A sequence number of a valid reservation has to be within a specified range that can be calculated using the following equation:

$$(\text{nextSequence} - \text{max Slot}) \leq \text{Sequence} < \text{nextSequence} \quad (1)$$

wherein: nextSequence is a value stored in the sequence region 420 of the next slot 412; maxSlot is the total number of slots 412 in buffer 316; and Sequence is a variable stored in the sequence region 420 of the slot 412 being evaluated indicating the sequence number for the current reservation to which the slot 412 was assigned.

If the equation is satisfied, Sequence is considered valid, and a signature value stored in the signature region 422 and a tail value stored in the tail region 418 can be validated. If the values indicate that the writing was not completed, the information in the slot 412 is ignored as invalid.

The reservation system 306 is enabled to clear or reset the buffer 316 in order to remove the existing reservations. By incrementing the atomic counter value by a multiple of a total number of slots 412 in the buffer 316 (maxSlots), current reservations are reset. The next reservation may still occur in the same slot index due to modulo arithmetic but during the parsing stage, all the previous reservations having sequence numbers that are out of the valid range failing to satisfy equation 1 may be ignored. As a result, the reservation system 306 can quickly and effectively remove previous reservations without the necessity to lock out new reservations or modify existing reservations. Resetting the buffer 316 is not applicable when continuous dumps are used.

The reservation system 306 is enabled to operate in wrap, non-wrap and dump modes. In the wrap mode, buffer 316 operates as a circular buffer 316 with the stored information in the buffer 316 being cyclically overwritten. In the dump mode, information from the buffer 316 can also be dumped as a file into the persistent memory 214. Dumping can be performed either occasionally (for example, periodically or on-demand) or continuously.

In the wrap mode, the buffer 316 preserves only the most recent reservations which is often desirable in a diagnostic facility. Buffer wrapping occurs in an incremental implementation when the value of the atomic sequence exceeds the total number (maxSlot) of slots 412 in the buffer 316.

Figure 5:
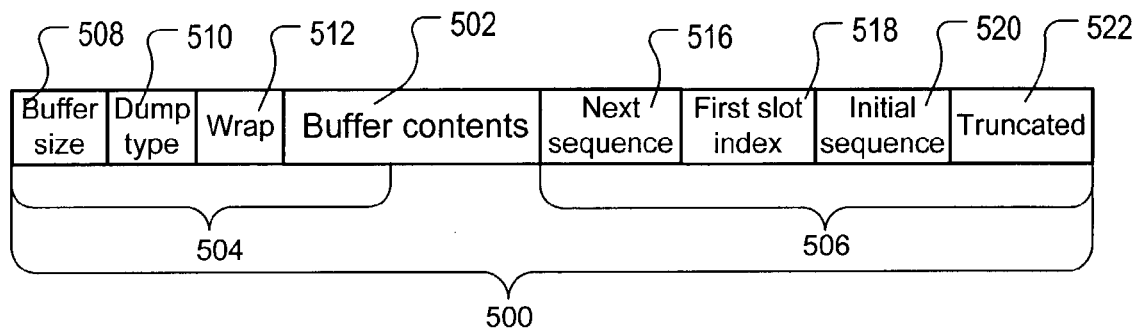
FIG. 5 is schematic block diagram illustrating a structure of a dump file for instantaneously dumping.

FIG. 5 is a schematic block diagram illustrating a structure of a dump file 500 for occasional dumping. The dump file 500 comprises buffer contents 502 that is preceded by a header region 504 and ended by a dump file tail region 506. In the case of continuous dumping, the reservation system 306 does not use the dump file tail region 506 and respectively uses only the dump file header region 504.

The header region 504 of the buffer 316 comprises a buffer size region 508, a dump type region 510, and a wrap region 512.

The buffer size region 508 is used for storing information about the total number of bytes in the buffer 316. The number of slots 412 in the buffer 316 can be calculated using a value stored in the buffer size region 508. The dump type region 510 is used for storing a variable that indicates an active type of dumping that can be either occasional or continuous. The wrap region 512 is used for storing a variable that indicates a status of buffer wrapping (e.g. active or not). In the present embodiment of the invention, a nonzero value stored in the wrap region 512 indicates that the buffer wrapping is enabled. Otherwise the value is zero.

The dump file tail region 506 comprises a next sequence region 516, a first slot index region 518, an initial sequence region 520 and a truncated region 522. The next sequence region 516 is used for storing a low 32-bit sequence value of the next reservation that is taken from the current value of the next sequence variable in the control block, control region 404 FIG. 4A. The first slot index region 518 is used for storing the slot index variable of the first slot 412 to parse. If buffer wrapping is disabled, this value is equal to zero. The initial sequence region 520 is used to determine if the buffer 316 has wrapped and is applicable if buffer wrapping was enabled. The truncated region 522 is used as a flag that indicates whether or not the buffer 316 was truncated. This is only applicable if buffer wrapping was disabled.

For I/O efficiency, in the present embodiment of the invention the size of the chunk 410 is 128 kilobytes and the size of the slot 412 is 64 bytes. Thus, each chunk 410 comprises 2048 slots 412.

Figure 6:
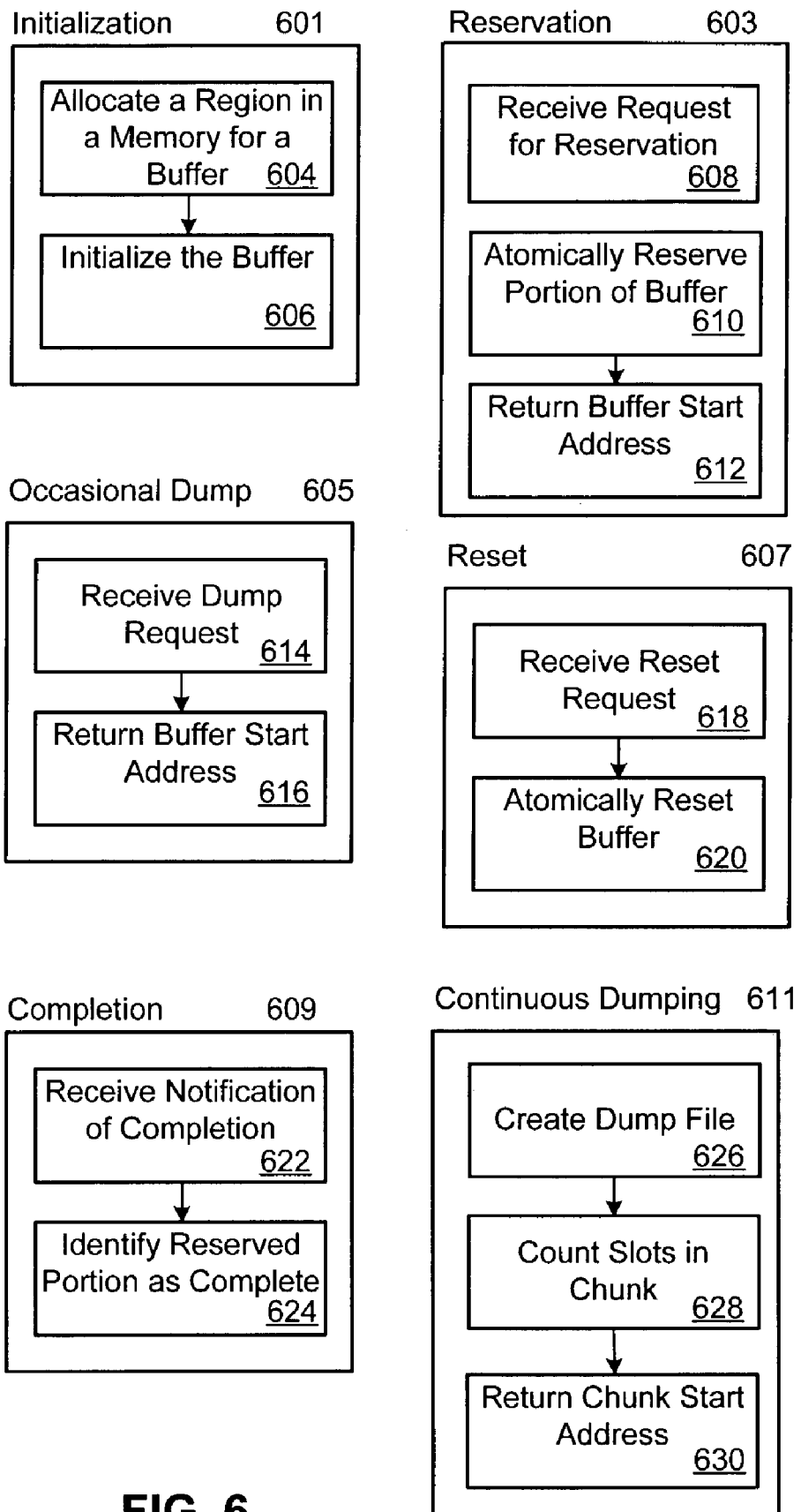
FIG. 6 is a schematic block diagram with flow charts illustrating exemplary methods and their operational steps of the reservation system.

FIG. 6 is a block diagram with flow charts illustrating exemplary methods and the main operational steps involved in reserving portions of the buffer 316 as well as dumping and resetting the buffer 316. FIG. 6 shows methods for initialization 601, reservation 603, occasional dumping 605, resetting 607, completion 609, and continuous dumping 611. In an initialization step (Step 604), the reservation system 306 reserves a contiguous region of memory, region 402, for the buffer 316 using OS 302. The system 306 allocates the required amount of volatile memory 212 to accommodate a specified predetermined size of buffer 316 and provides a starting address of the buffer 316 in the volatile memory 212. As is described in FIG. 4, the buffer 316 starts from the control region 404 which is used for storing an atomic counter variable. Next, the reservation system 306 initiates the buffer 316 (Step 606) making it ready for further writing information from writers 317. As is described above, each writer 317 may request a reservation of a portion of the buffer 316 using interface 308.

The reservation system 306 receives a request (Step 608) to reserve one or more slots 412 to provide an adequate size of the memory 204 for the data. Reservations may be made on slot boundaries allocating one or more complete slots 412. A reservation cannot exceed the total number of slots 412 in the buffer 316. Also, in the present embodiment of the invention, individual reservations cannot be larger than a single chunk 410. In the present embodiment of the invention having a slot size of 64 bytes, the header region 414 is equal to 8 bytes comprising the sequence region having 4 bytes, the signature region 422 having 2 bytes and a slots number region having 2 bytes. The size of the tail region 418 is 4 bytes.

Upon receipt of a request, the reservation system 306 atomically reserves a portion of the buffer 316 (Step 610). The atomic counter variable representing the next available slot 412 in the sequence (nextsequence) is maintained in control block, control region 404. The counter's initial value is zero. To avoid the overhead of using system semaphores, latches or other expensive synchronization mechanisms, atomic operations are use when altering this variable. When a reservation is made, nextsequence is atomically incremented by the number of slots required, the value of nextsequence prior to the increment being assigned to the variable sequence to indicate the starting slot 412 of the reservation. The value of sequence is used to determine the actual address for the reservation in the memory 204 (Step 612) for providing to the writer 317. On most hardware platforms, variables such an atomic counter variable can only be performed on word-sized boundaries. Consequently, the sequence number returned when the atomic counter variable is atomically incremented may represent an effective memory address that exceeds the actual address available memory addresses of the buffer 316. For example, on a 32-bit platform, the atomic counter variable is a 32-bit integer, which could be an index for over four billion slots 412 having an addressable range of $2^{38}$ bytes (assuming the slot size is 64 or $2^{6}$). In practice, the buffer 316 is much smaller. To solve the problem of an adequate counting of a slot index, a modulo arithmetic is used to constrain the range of values of the sequence variable, between zero and a maxSlot-1. Using modulo arithmetic in an equation, the next sequence variable can be atomically incremented without additional range checking. This is important in case the next sequence value overflows or exceeds the total number of slots 412 in the buffer 316. However, allowing the next sequence variable to overflow implies that the maximum number of slots value in the buffer 316 should always be a power of two. This ensures that no slots 412 are skipped when the next sequence value overflows.

The slot index (slotindex) on first slot 412 for a reservation is calculated in accordance with the equation:

$$slotIndex = Sequence \ \% \ max \ Slot \quad (2)$$

Wherein: Sequence is a value of the atomic counter assigned for a current reservation; % is an operand of a modulo operation; MaxSlot variable is a total number slots 412 in the buffer 316 or the number slots 412 in the current chunk 410 if more than one chunk 410 is used in the reservation system 306. This equation is used to calculate a slotIndex, which is a slot number in the buffer 316.

When the slotIndex is known, equation (3) is used to calculate an address of the slot 412 in the memory 204.

$$Address = StartingAddress + (slotIndex * SlotSize) + ControlSize \quad (3)$$

Wherein: StartingAddress is a starting address of the buffer 316 as defined in Step 604; SlotSize is a size in bytes of a slot 412 in the buffer 316 (e.g. 64 bytes), which is a constant value after a buffer initiation; and ControlSize is the size in bytes of a control region 404 in FIG. 4A.

With the value of the variable Address thus calculated, the requesting writer 317 may then write information in the reserved region of the memory 204 at Address (not shown). The writer 317 then notifies the reservation system 306 of successful completion of writing (step 622). On receipt of a notification from a writer 317, the reservation system 306 synchronizes the written information (step 624) by writing predetermined values into signature region 422 and tail region 418 of a reserved slot 412 for the writer 317. The process of synchronization occurs in parallel with minimal effect on the performance of reservation steps from 608 to 612. Since the information is synchronized and the slots 412 are reserved for the writer 317, the reservation in the reserved slot 412 is considered to be valid.

Occasionally a reservation request cannot be initially accommodated because the number of slots 412 required by a writer 317 exceeds the number of contiguous slots 412 at the end of the buffer 316. In the buffer wrapping mode, the reservation system 306 maintains its atomic reservation mechanism by automatically repeating the reservation as described further below.

Figure 7A:
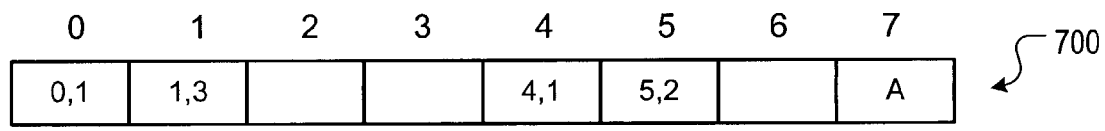
FIG. 7 is comprised of FIGS. 7A and 7B, and represents and illustration of a reservation example of slots using a repeated reservation.
Figure 7B:
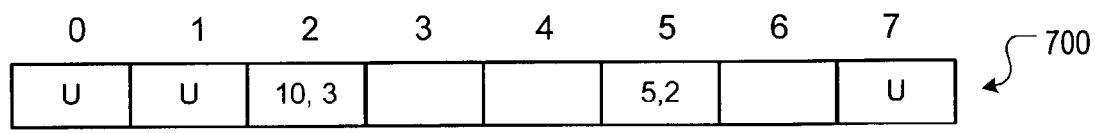

FIGS. 7A and 7B illustrate an example reservation of slots 412 using a repeated reservation. An exemplary buffer 700 comprises 8 slots 412. Seven slots 412 from 0 to 6 have been reserved through four previous reservations FIG. 7A. (e.g., a reservation at the slot "0" for one slot 412; a reservation starting at slot "1" for three slots 412 including slots "1", "2" and "3"; a reservation at slot "4" for one slot 412; and a reservation at slot "5" for two slots 412 comprising slots "5" and "6"). Slot "7" remains available for reservation and the value of the next sequence variable is equal to seven. If a writer 317 requests three slots 412, the value of the next sequence variable may be atomically incremented to ten and the value of the slot index variable becomes equal to seven. A region comprising slots "7", "0" and "1" has been reserved for a writer 317. However, since the reserved region is not contiguous, the reservation is repeated by atomically incrementing the next sequence variable by three FIG. 7B. This results in a reservation of another region comprising slots "2", "3" and "4". The previously reserved region (slots "7", "0" and "1") is considered to be unused. It may be ignored during parsing, for example. Repeated reservation, while somewhat wasteful of slots 412, facilitates reduced synchronization and thus reduces serialization.

To avoid additional synchronisation on the nextSequence counter, double reservations and in fact all reservations are performed without determining whether the assigned slots 412 were still in use due to a previous reservation before a buffer wrap. If buffer wrapping is disabled and if the buffer is full, then the index of the next available slot 412 of the next reservation is equal to or greater than the maximum number of slots 412 (maxSlot) in the buffer 316, and buffer truncation occurs. Once the buffer 316 is full the reservation system 306 prevents further reservations by flagging the truncated region 522 inside the structure of the dump file tail region 506. Rather than provide a null address indicating a failed reservation, the reservation system 306 invokes a call back function supplied by writer 317. This function could disable the writing activity of the writer 317 and reset or dump and reset the buffer. The location of the wasteland region 408 may be supplied following the callback. The wasteland region 408 can be ignored during parsing. A callback optimizes application (i.e. writer 317) code avoiding checks for null or special addresses.

System 306 as is described above, can be enabled to facilitate dumping the stored data in the buffer 316 to a persistent storage such as hard drive. The file dumping can be performed continuously or occasionally.

Continuous dumping creates an infinite buffer size because the reservation system 306 records reservations on the hard drive and prevents the buffer from overwriting previous reservations (wrapping). FIG. 6 shows continuous dump method 611.

Prior to the start of a continuous dumping process or thread, a dump file 500 FIG. 5 is created (step 626). The interface 308 then repeatedly queries the full count of chunk 410 (step 628), which is used to control each chunk 410. When a chunk 410 is full, the interface 308 calculates the starting address (step 630) of the chunk 410 in the buffer (step 630). The entire chunk 410 is then written to the dump file 500. Once the chunk 410 is recorded on the disk, the next chunk 410 can be examined for further writing to a dump file 500, repeating all dumping processes as long as necessary. During continuous dumping mode the reservations of the writer 317 are blocked to ensure that no writer 317 can overwrite existing reservations in an un-dumped chunk 410. If continuous dumping is enabled, the sequence number of each reservation is not checked because there is no requirement for sequence number range. As long as the synchronization value is appropriate, a reservation is considered to be valid and complete. Sequence numbers are ignored during the parsing of a continuous dump file 500.

The buffer 316 can be dumped to the disk at any time, in response to a request. FIG. 6 shows occasional dump method 605. The reservation system 306 on receipt of a dump request (step 614) from the application 310, returns buffer start address and size (step 616) to the application 310, which is responsible for writing the data. Then the application 310 writes the content of the buffer and synchronization information as a dump file 500 FIG. 5 on the disk.

As is described above, the system parsing logic expects valid reservations to fall within a specific sequence number range that is defined by formula (1). By altering the sequence values at run-time, the valid range of reservations can be changed. Thus, during the parsing stage the previously valid reservation may be considered old and may be ignored. This feature employs different techniques depending on whether buffer wrapping is enabled or disabled. If buffer wrapping is enabled, a sequence value is atomically incremented by maxSlots to invalidate all previous reservations in the buffer. After the sequence value is incremented, only new reservations may be considered valid and all other reservations may be considered invalid. A slot index of a reserved slot 412 remains the same (e.g., its location in the buffer remains the same).

Reset method 607 is shown in FIG. 6. The reset request is received (step 618). If the buffer is reset, when buffer wrapping is disabled the system atomically adjusts the sequence value to the value that defines the next reservation at zero slot index (step 620). Once the slot index value equals or exceeds the maximum number of slots 412, the buffer is considered to be full and the system stops any writing into the buffer. Therefore, when the buffer is cleared, the first reservation after the clearing, begins at slot index zero.

The reservation system 306 does not serialize writing to the buffer 316, making possible a situation in which a writer 317 makes a reservation but does not modify the data in the reserved slots 412 of the buffer 316 until the buffer 316 has been cleared or overwritten. The buffer 316 is more susceptible to this problem in the non-wrapping mode because during the process of clearing (which makes the next reservation slot index to always be "0") a second writer 317 may be reserved in the same slots 412 that were previously reserved by the first writer 317. The first writer 317 might use its reserved slots 412 at any time. If the second writer 317 modifies and synchronizes the slots 412 after the first writer 317 has modified the same slots 412, this creates a situation in which overwrites the new data from was reserved and sequence number. When the buffer is dumped and parsed, the data in the rewritten slots 412 may be ignored and only slots 412 that follow after the rewritten slots 412 may be considered valid.

When buffer wrapping is enabled, the rewriting problem is minimized because the slot index may not be reset back to 0. As a result, the first writer 317 would likely never overwrite new data, especially if the buffer size is substantially large.

When buffer wrapping is allowed, the buffer may be wrapped and previous reservations may be overwritten by new reservations. It is desirable for the parsing stage to know if a buffer has been wrapped. In most situations, the parsing logic can detect when a buffer has wrapped by comparing the next sequence value stored the next sequence region 516 in the dump file tail region 506 with an initial sequence value stored in the initial sequence region 520, which indicates the oldest possible reservation sequence number. Initially the value of the initial sequence value is zero. If the difference between the sequence value and the initial sequence value exceeds the value of maxSlots, the buffer was wrapped. If buffer wrapping is disabled, the initial sequence value is meaningless. A situation may arise where the reservation system can not detect whether the buffer has wrapped. This occurs when the next sequence value overflows. As an example, in a buffer having 8 slots 412, a large number of reservations are made. Consequently, the next sequence value may eventually overflow. If this occurs and the buffer is dumped, the embedded in the tail structure of the dump file 500 the next sequence value might equal 2. Since the difference between the initial sequence value and next sequence value is less than maxSlots, the conclusion that the buffer has wrapped may be made; this conclusion would be incorrect because the buffer has wrapped numerous times.

Conversely, when buffer wrapping is disabled, buffer truncation can occur. Once the buffer is full, the buffer is prevented from future reservations. This scenario is detected and flagged inside the dump file tail region 506 (truncated region 522). If the slot index of the next reservation is greater than or equal to the maxSlots the buffer considered truncated because further reservations cannot be accommodated.

A reservation system 306 in accordance with the present invention serves to reduce writer synchronization in an application sharing memory among a plurality of writers. The use of an atomic counter to indicate the next available portion of memory within a synchronization mechanism ensures that individual writers are temporarily assigned unique portions of the memory efficiently.

It is to be understood that the specific embodiments of the invention that have been described are merely illustrative of certain application of the principle of the present invention. Numerous modifications may be made to the reduced synchronization reservation system and method for a shared memory buffer invention described herein without departing from the spirit and scope of the present invention.

What is claimed is:

1. A processor-implemented data processing method for reserving portions of a shared memory buffer among a plurality of writers sharing the buffer, the data processing method comprising:
   receiving and responding to individual requests from the plurality of the writers;
   wherein each request from an individual writer reserves a contiguous portion of the memory buffer for writing by the writer;
   atomically reserving a portion of the shared memory buffer in response to each request;
   wherein atomically reserving the portion of the shared memory buffer comprises sequentially reserving contiguous portions of the shared memory buffer in sequence;
   wherein the contiguous portion comprises a number of fixed size memory regions;
   wherein atomically reserving the portion of the shared memory buffer comprises maintaining information corresponding to a next contiguous memory portion available for reservation;
   incrementing by a number of fixed size memory, regions to be reserved in accordance with the request;
   wherein atomically reserving the portion of the shared memory buffer comprises counting the number of fixed size memory regions reserved for the contiguous portion; and
   wherein the reserved contiguous portion comprises a parsing region for storing information associated with a value of the atomic counter, to facilitate an identification of the reserved contiguous portion.

2. The data processing method of claim 1, further comprising indicating that a reserved portion is complete upon notification of a complete writing by a writer.

3. The data processing method of claim 1, further comprising facilitating the reading of the shared memory data buffer for at least one of writing out the shared memory buffer to a persistent storage medium, wherein the reading minimally impacts the writing to the shared memory buffer.

4. The data processing method of claim 1, further comprising invalidating a current content of the shared memory buffer.

5. The data processing method of claim 1, wherein the shared memory buffer comprises a control region for storing an atomic counter.

6. The data processing method of claim 1, further comprising logically dividing the shared memory buffer into a plurality of fixed size memory regions.

7. The data processing method of claim 6, further comprising logically grouping the fixed size memory regions in contiguous memory units having a predetermined number of the fixed size memory regions.

8. The data processing method of claim 6, further comprising atomically invalidating a current content of the shared memory buffer.

9. The data processing method of claim 8, wherein atomically invalidating the current content of the shared memory buffer comprises invalidating the current content of the shared memory buffer by incrementing an atomic counter by the number of fixed size memory regions in the buffer.

10. The data processing method of claim 6, further comprising logically grouping the fixed size memory regions in contiguous memory units having a predetermined number of the fixed size memory regions.

11. The data processing method of claim 6, further comprising atomically invalidating a current content of the shared memory buffer.

12. The data processing method of claim 8, wherein atomically invalidating the current content of the shared memory buffer comprises invalidating the current content of the shared memory buffer by incrementing an atomic counter by the number of fixed size memory regions in the buffer.

13. A processor-implemented data processing method for reserving portions of a shared memory buffer among a plurality of writers sharing the buffer, the data processing method comprising:
   receiving and responding to individual requests from the plurality of the writers;
   wherein each request from an individual writer reserves a contiguous portion of the memory buffer for writing by the writer;
   atomically reserving a portion of the shared memory buffer in response to each request;
   wherein atomically reserving the portion of the shared memory buffer comprises sequentially reserving contiguous portions of the shared memory buffer in sequence;
   wherein the contiguous portion comprises a number of fixed size memory regions;
   wherein atomically reserving the portion of the shared memory buffer comprises maintaining information corresponding to a next contiguous memory portion available for reservation;
   incrementing by a number of fixed size memory, regions to be reserved in accordance with the request;

wherein atomically reserving the portion of the shared memory buffer comprises counting the number of fixed size memory regions reserved for the contiguous portion;

wherein the reserved contiguous portion comprises a synchronization region; and wherein indicating that the reserved portion is complete upon notification of the complete writing by the writer comprises storing information to a synchronization region, to indicate that the reserved contiguous portion is complete.

14. The data processing method of claim 13, further comprising indicating that a reserved portion is complete upon notification of a complete writing by a writer.

15. The data processing method of claim 13, further comprising facilitating the reading of the shared memory data buffer for at least one of writing out the shared memory buffer to a persistent storage medium, wherein the reading minimally impacts the writing to the shared memory buffer.

16. The data processing method of claim 13, further comprising invalidating a current content of the shared memory buffer.

17. The data processing method of claim 13, wherein the shared memory buffer comprises a control region for storing an atomic counter.

18. The data processing method of claim 13, further comprising logically dividing the shared memory buffer into a plurality of fixed size memory regions.

19. A processor-implemented data processing method for reserving portions of a shared memory buffer among a plurality of writers sharing the buffer, the data processing method comprising:

receiving and responding to individual requests from the plurality of the writers;

wherein each request from an individual writer reserves a contiguous portion of the memory buffer for writing by the writer;

atomically reserving a portion of the shared memory buffer in response to each request;

wherein atomically reserving the portion of the shared memory buffer comprises sequentially reserving contiguous portions of the shared memory buffer in sequence;

wherein the contiguous portion comprises a number of fixed size memory regions;

wherein atomically reserving the portion of the shared memory buffer comprises maintaining information corresponding to a next contiguous memory portion available for reservation;

incrementing by a number of fixed size memory, regions to be reserved in accordance with the request;

facilitating the reading of the shared memory data buffer for at least one of writing out the shared memory buffer to a persistent storage medium, wherein the reading minimally impacts the writing to the shared memory buffer;

comprising facilitating the writing out of a content of the shared memory buffer as a file to the persistent storage medium; and wherein the file comprises the content of the shared memory buffer and validation information for parsing.

20. A processor-implemented data processing method for reserving portions of a shared memory buffer among a plurality of writers sharing the buffer, the data processing method comprising:

receiving and responding to individual requests from the plurality of the writers;

wherein each request from an individual writer reserves a contiguous portion of the memory buffer for writing by the writer;

atomically reserving a portion of the shared memory buffer in response to each request;

wherein atomically reserving the portion of the shared memory buffer comprises sequentially reserving contiguous portions of the shared memory buffer in sequence;

wherein the contiguous portion comprises a number of fixed size memory regions;

wherein atomically reserving the portion of the shared memory buffer comprises maintaining information corresponding to a next contiguous memory portion available for reservation;

incrementing by a number of fixed size memory, regions to be reserved in accordance with the request; and repeating the reservation of the contiguous portion if the reserved fixed size memory regions of the reserved contiguous portion are not contiguous.

21. A processor-implemented data processing method for reserving portions of a shared memory buffer among a plurality of writers sharing the buffer, the data processing method comprising:

receiving and responding to individual requests from the plurality of the writers;

wherein each request from an individual writer reserves a contiguous portion of the memory buffer for writing by the writer;

atomically reserving a portion of the shared memory buffer in response to each request;

wherein atomically reserving the portion of the shared memory buffer comprises sequentially reserving contiguous portions of the shared memory buffer in sequence;

wherein the contiguous portion comprises a number of fixed size memory regions;

wherein atomically reserving the portion of the shared memory buffer comprises maintaining information corresponding to a next contiguous memory portion available for reservation;

incrementing by a number of fixed size memory, regions to be reserved in accordance with the request;

wherein each fixed size memory region comprises a body region for storing information from the writer; and storing validation information generated by a finalization function that validates the shared memory buffer.

22. The data processing method of claim 21, wherein the validation information comprises information associated with the atomic counter and a number fixed size regions reserved for the writer.

23. A computer program product having instruction codes stored on a computer-readable medium, for reserving portions of a shared memory buffer among a plurality of writers sharing the buffer, the computer program product comprising:

a first set of instruction codes for receiving and responding to individual requests from the plurality of the writers;

wherein each request from an individual writer reserves a contiguous portion of the memory buffer for writing by the writer;

a second set of instruction codes for atomically reserving a portion of the shared memory buffer in response to each request;

wherein the second set of instruction codes sequentially reserves contiguous portions of the shared memory buffer in sequence;

wherein the contiguous portion comprises a number of fixed size memory regions;

wherein the atomic counter maintains information corresponding to a next contiguous memory portion available for reservation; and a third set of instruction codes increments by a number of fixed size memory, regions to be reserved in accordance with the request;

wherein the atomic counter counts the number of fixed size memory regions reserved for the contiguous portion; and wherein the reserved contiguous portion comprises a parsing region for storing information associated with a value of the atomic counter, to facilitate an identification of the reserved contiguous portion.

24. The computer program product of claim 23, further comprising a fourth set of instruction codes for indicating that a reserved portion is complete upon notification of a complete writing by a writer.

25. The computer program product of claim 24, further comprising a fifth set of instruction codes for facilitating the reading of the shared memory data buffer for at least one of writing out the shared memory buffer to a persistent storage medium, wherein the reading minimally impacts the writing to the shared memory buffer.

26. The computer program product of claim 23, further comprising a sixth set of instruction codes for invalidating a current content of the shared memory buffer.

27. The computer program product of claim 23, wherein the shared memory buffer comprises a control region for storing an atomic counter.

28. A data processing system for reserving portions of a shared memory buffer among a plurality of writers sharing the buffer, the data processing system comprising:

means for receiving and responding to individual requests from the plurality of the writers;

wherein each request from an individual writer reserves a contiguous portion of the memory buffer for writing by the writer;

means for atomically reserving a portion of the shared memory buffer in response to each request wherein the means for atomically reserving the portion of the shared memory buffer in response to each request sequentially reserves contiguous portions of the shared memory buffer in sequence;

wherein the contiguous portion comprises a number of fixed size memory regions;

wherein the shared memory buffer comprises a control region for storing an atomic counter that maintains information corresponding to a next contiguous memory portion available for reservation; and means for incrementing by a number of fixed size memory, regions to be reserved in accordance with the request;

wherein the atomic counter counts the number of fixed size memory regions reserved for the contiguous portion; and wherein the reserved contiguous portion comprises a parsing region for storing information associated with a value of the atomic counter, to facilitate an identification of the reserved contiguous portion.

29. The data processing system of claim 28, further comprising means for indicating that a reserved portion is complete upon notification of a complete writing by a writer.

30. The data processing system of claim 29, further comprising means for facilitating the reading of the shared memory data buffer for at least one of writing out the shared memory buffer to a persistent storage medium, wherein the reading minimally impacts the writing to the shared memory buffer.

31. The data processing system of claim 28, further comprising means for invalidating a current content of the shared memory buffer.

* * * * *